United States Patent
Ke (10) Patent No.: US 10,776,042 B2
(45) Date of Patent: Sep. 15, 2020

(54) METHODS FOR GARBAGE COLLECTION AND APPARATUSES USING THE SAME

(71) Applicant: Silicon Motion, Inc., Jhubei, Hsinchu County (TW)

(72) Inventor: Kuan-Yu Ke, Zhubei (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 9 days.

(21) Appl. No.: 15/863,894

(22) Filed: Jan. 6, 2018

(65) Prior Publication Data

US 2018/0275914 A1  Sep. 27, 2018

(30) Foreign Application Priority Data

Mar. 22, 2017  (TW) .............................. 106109513 A (51) Int. Cl.
 *G06F 3/06* (2006.01)
 *G06F 12/02* (2006.01)

(52) U.S. Cl.
 CPC ............ *G06F 3/0652* (2013.01); *G06F 3/061* (2013.01); *G06F 3/0679* (2013.01); *G06F 12/0246* (2013.01); *G06F 2212/7205* (2013.01)

(58) Field of Classification Search
 CPC ......... G06F 12/0253; G06F 2212/7205; G06F 3/0679; G06F 3/0688; G06F 12/0246; G06F 3/0652
 See application file for complete search history.

(56) References Cited

U.S. PATENT DOCUMENTS

| | | | |
|---|---|---|---|
| 5,640,529 A * | 6/1997 | Hasbun ................. | G06F 3/0601 707/999.202 |
| 6,580,965 B2 | 6/2003 | Fujiwara | |
| 7,509,360 B2 | 3/2009 | Wollrath et al. | |
| 2007/0136401 A1 | 6/2007 | Jung et al. | |
| 2013/0191580 A1* | 7/2013 | Lasser ................. | G06F 12/0246 711/103 |
| 2015/0006786 A1* | 1/2015 | Cabrera ................. | G06F 3/0659 711/103 |
| 2015/0019797 A1 | 1/2015 | Huang et al. | |

OTHER PUBLICATIONS

Wikipedia, "Interrupt", Feb. 14, 2016, Internet Archive, pp. 1-9 https://web.archive.org/web/20160214062236/https://en.wikipedia.org/wiki/Interrupt/ (Year: 2016).*
Interleave, v. 1993, Oxford University Press, online Oxford English Dictionary, pp. 1-2 (Year: 1993).*

* cited by examiner

*Primary Examiner* — Reginald G Bragdon
*Assistant Examiner* — Curtis James Kortman
(74) *Attorney, Agent, or Firm* — McClure, Qualey & Rodack, LLP (57) ABSTRACT

The invention introduces a method for garbage collection, performed by a processing unit, including at least the following steps: executing instructions of a GC (garbage collection) process to direct a first access interface to read data from a storage unit, collect good data from the read data and direct the first access interface to program the good data into a spare block of the storage unit. During the GC process, each time that a timer has counted to a time period, the processing unit directs a second access interface to clock a portion of data requested by a host device out to the host device and resets the timer.

14 Claims, 6 Drawing Sheets

METHODS FOR GARBAGE COLLECTION AND APPARATUSES USING THE SAME

CROSS REFERENCE TO RELATED APPLICATIONS

This Application claims priority of Taiwan Patent Application No. 106109513, filed on Mar. 22, 2017, the entirety of which is incorporated by reference herein.

BACKGROUND

Technical Field

The present invention relates to flash memory, and in particular to methods for garbage collection and apparatuses using the same.

Description of the Related Art

Flash memory devices typically include NOR flash devices and NAND flash devices. NOR flash devices are random access—a host accessing a NOR flash device can provide the device any address on its address pins and immediately retrieve data stored in that address on the device's data pins. NAND flash devices, on the other hand, are not random access but serial access. It is not possible for NAND to access any random address in the way described above. Instead, the host has to write into the device a sequence of bytes which identifies both the type of command requested (e.g. read, write, erase, etc.) and the address to be used for that command. The address identifies a page (the smallest chunk of flash memory that can be written in a single operation) or a block (the smallest chunk of flash memory that can be erased in a single operation), and not a single byte or word. In reality, the NAND flash device always reads from the memory cells and writes to the memory cells complete pages. After a page of data is read from the array into a buffer inside the device, the host can access the data bytes or words one by one by serially clocking them out using a strobe signal.

If the data in some of the units of a page are no longer needed (such units are also called stale units), only the units with good data in that page are read and rewritten into another previously erased empty block. Then the free units and the stale units are available for new data. This is a process called garbage collection. The process of garbage collection involves reading data from the flash memory and rewriting data to the flash memory. It means that a flash controller first requires a read of the whole page, and then a write of the parts of the page which still include valid data. However, it may hinder data access operations requested by the host. It the worst case, it may cause the request time of a data access command to expire. Accordingly, what is needed are methods for garbage collection and apparatuses that use these methods to overcome the drawbacks described above.

BRIEF SUMMARY

An embodiment of the invention introduces a method for garbage collection, performed by a processing unit, including at least the following steps: executing instructions of a GC (garbage collection) process to direct a first access interface to read data from a storage unit, collect good data from the read data and direct the first access interface to program the good data into a spare block of the storage unit.

An embodiment of the invention introduces an apparatus for garbage collection including at least a first access interface, a second access interface and a processing unit. A first access interface is coupled to a storage unit. The second access interface is coupled to a host device. A processing unit, coupled to the first access interface and the second access interface, executes instructions of a GC process to direct the first access interface to read data from the storage unit, collect good data from the read data and direct the first access interface to program the good data into a spare block of the storage unit.

During the GC process, each time that a timer has counted to a time period, the processing unit directs a second access interface to clock a portion of data requested by a host device out to the host device and resets the timer.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It should be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
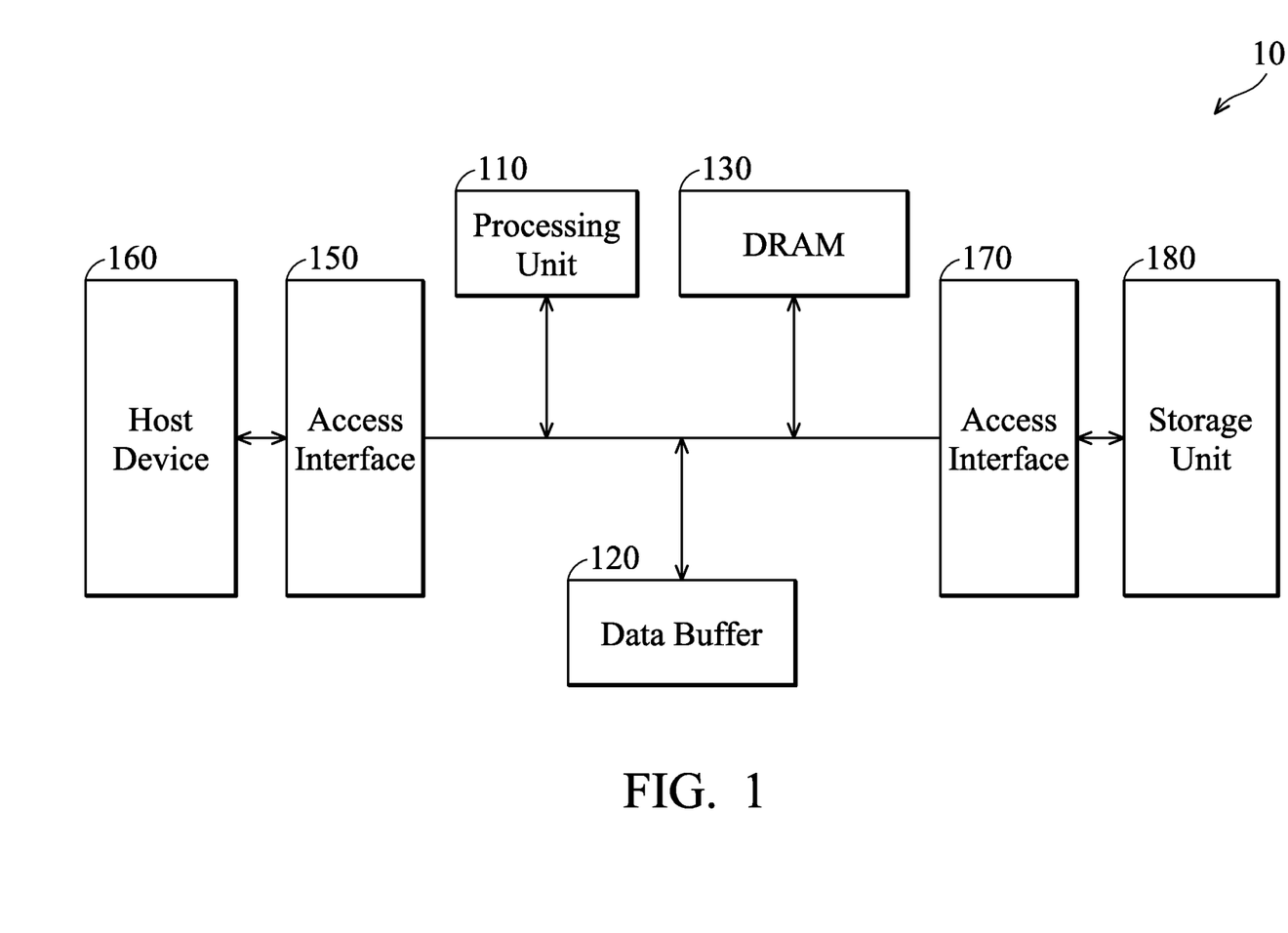
FIG. 1 is the system architecture of a flash memory according to an embodiment of the invention.

FIG. 1 is the system architecture of a flash memory 10 according to an embodiment of the invention. The system architecture 10 of the flash memory contains a processing unit 110 being configured to write data into a designated address of a storage unit 180, and read data from a designated address thereof. Specifically, the processing unit 110 writes data into a designated address of the storage unit 180 through an access interface 170 and reads data from a designated address thereof through the same interface 170. The flash memory 10 uses several electrical signals for coordinating commands and data transfer between the processing unit 110 and the storage unit 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc. The access interface 170 may communicate with the storage unit 180 using a SDR (Single Data Rate) protocol or a DDR (Double Data Rate) protocol, such as ONFI (open NAND flash interface), DDR toggle, or others. The processing unit 110 may communicate with the host device 160 through an access interface 150 using a standard protocol, such as USB (Universal Serial Bus), ATA (Advanced Technology Attachment), SATA (Serial ATA), PCI-E (Peripheral Component Interconnect Express) or others.

Figure 2:
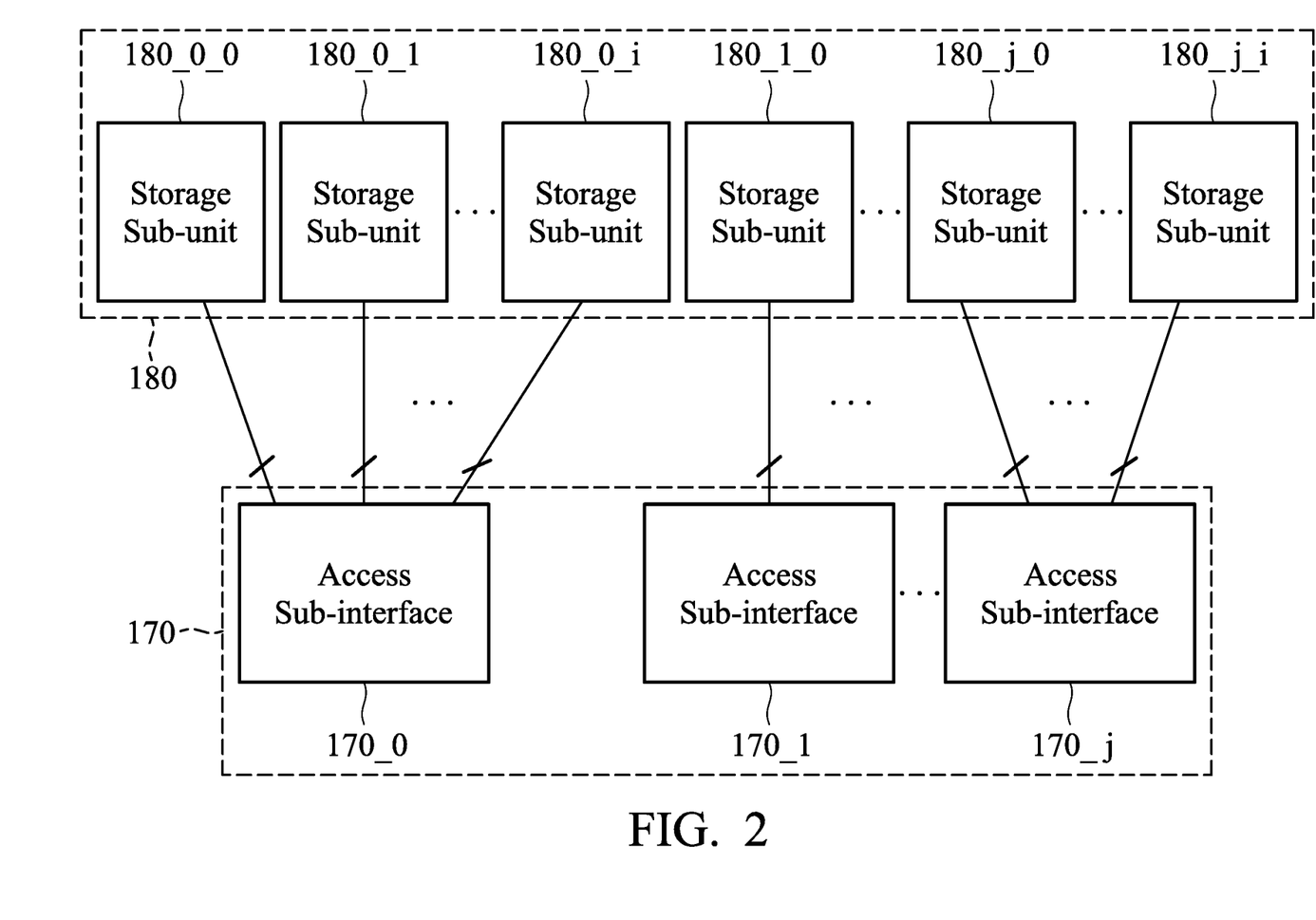
FIG. 2 is a schematic diagram illustrating interfaces to storage units of a flash storage according to an embodiment of the invention.
Figure 3:
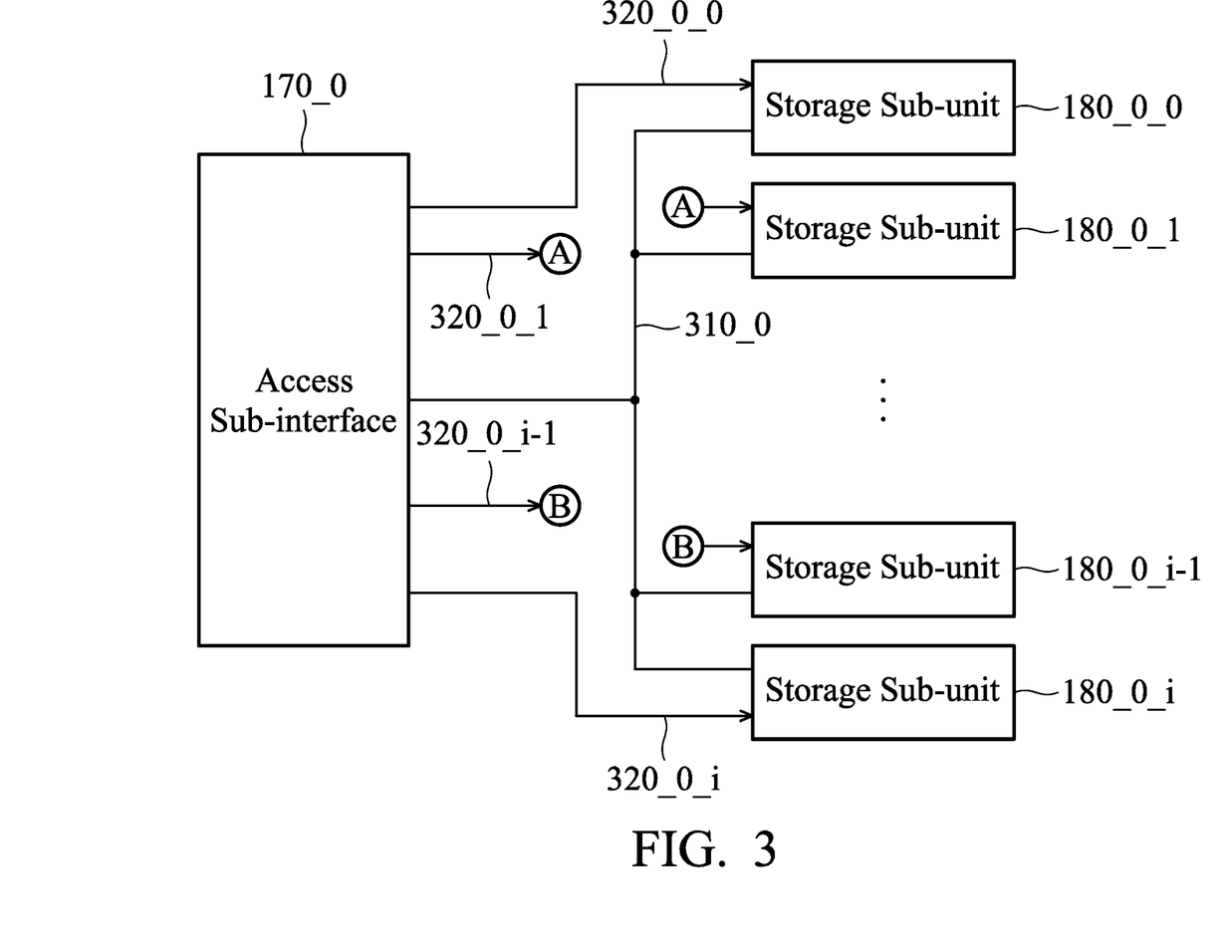
FIG. 3 is a schematic diagram depicting connections between one access sub-interface and multiple storage sub-units according to an embodiment of the invention.

The storage unit 180 may contain multiple storage sub-units and each storage sub-unit may be practiced in a single die and use an access sub-interface to communicate with the processing unit 110. FIG. 2 is a schematic diagram illustrating interfaces to storage units of a flash storage according to an embodiment of the invention. The flash memory 10 may contain j+1 access sub-interfaces 170_0 to 170_j, where the access sub-interfaces may be referred to as channels, and each access sub-interface connects to i+1 storage sub-units. That is, i+1 storage sub-units may share the same access sub-interface. For example, assume that the flash memory contains 4 channels (j=3) and each channel connects to 4 storage sub-units (i=3): The flash memory 10 has 16 storage sub-units 180_0_0 to 180_j_i in total. The processing unit 110 may direct one of the access sub-interfaces 170_0 to 170_j to read data from the designated storage sub-unit. Each storage sub-unit has an independent CE control signal. That is, it is required to enable a corresponding CE control signal when attempting to perform data read from a designated storage sub-unit via an associated access sub-interface. It is apparent that any number of channels may be provided in the flash memory 10, and each channel may be associated with any number of storage sub-units, and the invention should not be limited thereto. FIG. 3 is a schematic diagram depicting connections between one access sub-interface and multiple storage sub-units according to an embodiment of the invention. The processing unit 110, through the access sub-interface 170_0, may use independent CE control signals 320_0_0 to 320_0_i to select one of the connected storage sub-units 180_0_0 and 180_0_i, and then read data from the designated location of the selected storage sub-unit via the shared data line 310_0.

Figure 4:
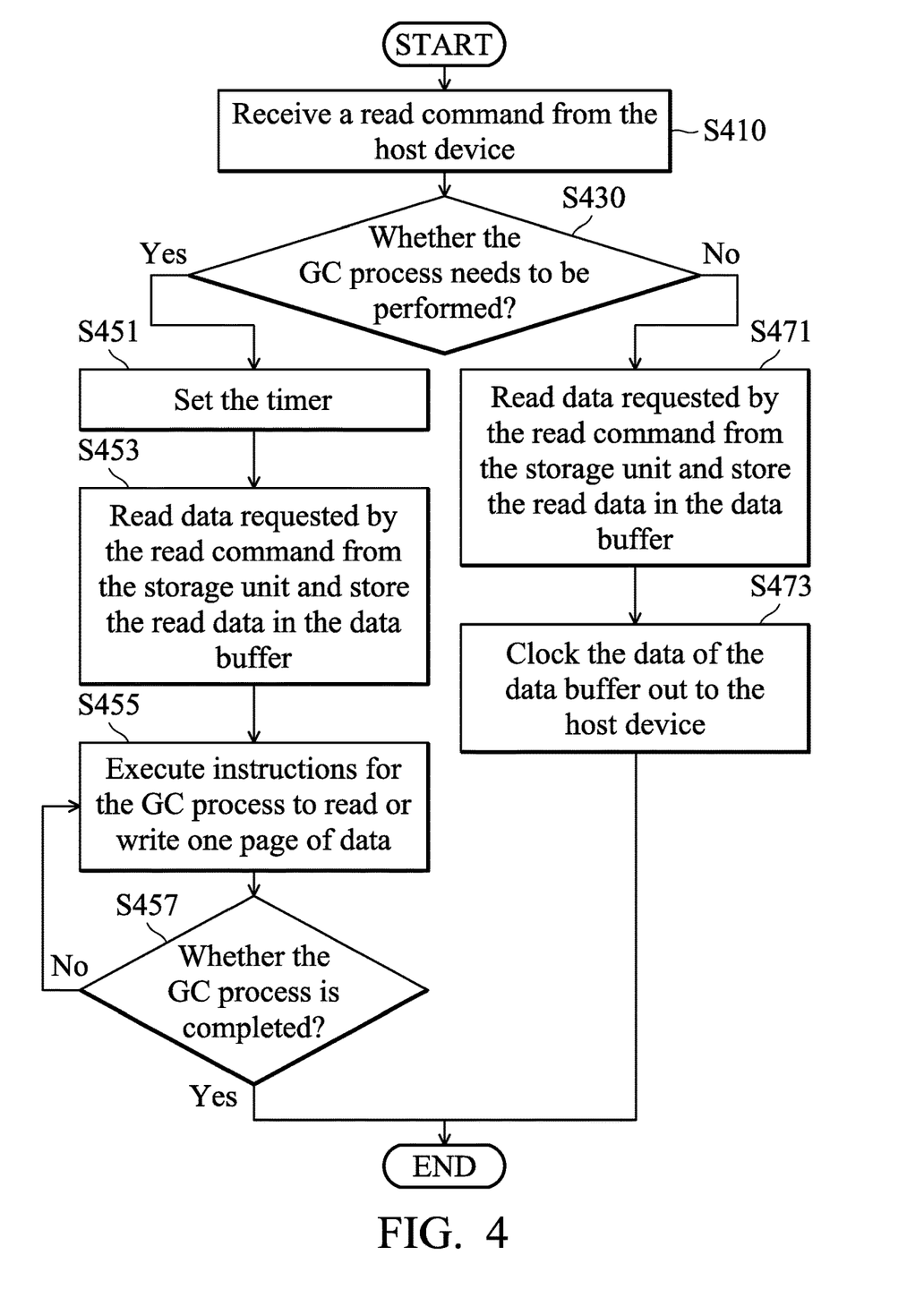
FIG. 4 is a flowchart illustrating a method for GC according to an embodiment of the invention.

After being accessed many times, one page may contain a portion of stale data. To address the aforementioned drawbacks, an embodiment of the invention introduce a method for GC (garbage collection) that performs data reads requested by the host device 160 interlaced with data-read-and-write operations of a GC process. For example, instructions of the GC process are executed to direct the access interface 170 to read data from the storage unit 180, collect good data from the read data and direct the access interface 170 to program good data into a spare block of the storage unit 180. In the GC process, each time a timer counts to a predetermined time period, the access interface 150 is directed to clock out at least a portion of data requested by the host device 160 and the timer is reset to avoid a read exception occurring in the host device 160 because no data has been received after a tolerable time. FIG. 4 is a flowchart illustrating a method for GC according to an embodiment of the invention. The method is performed when relevant microcode, macrocode or software instructions are loaded and executed by the processing unit 110. After each time a read command is received from the host device 160 through the access interface 150 (step S410), it is determined whether a GC process needs to be performed (step S430). In step S410, the read command contains information regarding a logical location. The logical location may be represented by one or more LBAs (Logical Block Addresses). In step S430, the processing unit 110 may determine whether the total number of spare blocks is fewer than a threshold. If so, the GC process is needed. Otherwise, no GC process is needed.

When no GC process is needed (the "No" path of step S430), the access interface 170 is directed to read data requested by the read command from the storage unit 180, the data is stored in the data buffer 120 (step S471) and the access interface 150 is directed to clock the data of the data buffer 120 out to the host device 160 (step S473). In order to optimize the data write efficiency, data with continuous LBAs is distributed stored across different physical regions of the storage unit 180. Thus, the DRAM (Dynamic Random Access Memory) 130 stores a storage mapping table, also referred to as an H2F (Host-to-Flash) table, to indicate which location of the storage unit 180 data of each LBA is physically stored in. In step S471, the processing unit 110 reads physical region(s) corresponding to logical location(s) from the storage mapping table, and then, directs the access interface 170 to read data from the physical region(s) of the storage unit 180. For example, the storage unit 180 may contain two channels and each channel may contain four storage sub-units. A controller (not shown) of the storage unit 180 may direct the two channels to read data of 128K bytes from the eight storage sub-units in one batch and the processing unit 110 stores the data in the data buffer 120. In step S473, the processing unit 110 may set one or more registers to clock data out to the host device 160 page by page. For example, one page may contain data of 16K bytes. The processing unit 110 may use eight batches, and in each batch, to clock one page of data out to the host device 160. In some embodiments, the data buffer 120 may be implemented in the DRAM 130.

When a GC process is needed (the "Yes" path of step S430), a timer is set to count to a shorter time period than the maximum tolerable time that the host device 160 waits for a data reply, such as 50 milliseconds (step S451), the access interface 170 is directed to read data requested by the read command from the storage unit 180, the read data is stored in the data buffer 120 (step S453), instructions for the GC process are executed to read or write one page of data (step S455) and it is determined whether the GC process is completed (step S457). In some embodiments, information regarding the maximum tolerable time may be set and stored in a non-volatile storage device before the flash memory leaves the factory, and is read from the non-volatile storage device in step S451. In some embodiments, information regarding the maximum tolerable time may be carried in the read command issued by the host device 160.

Figure 5:
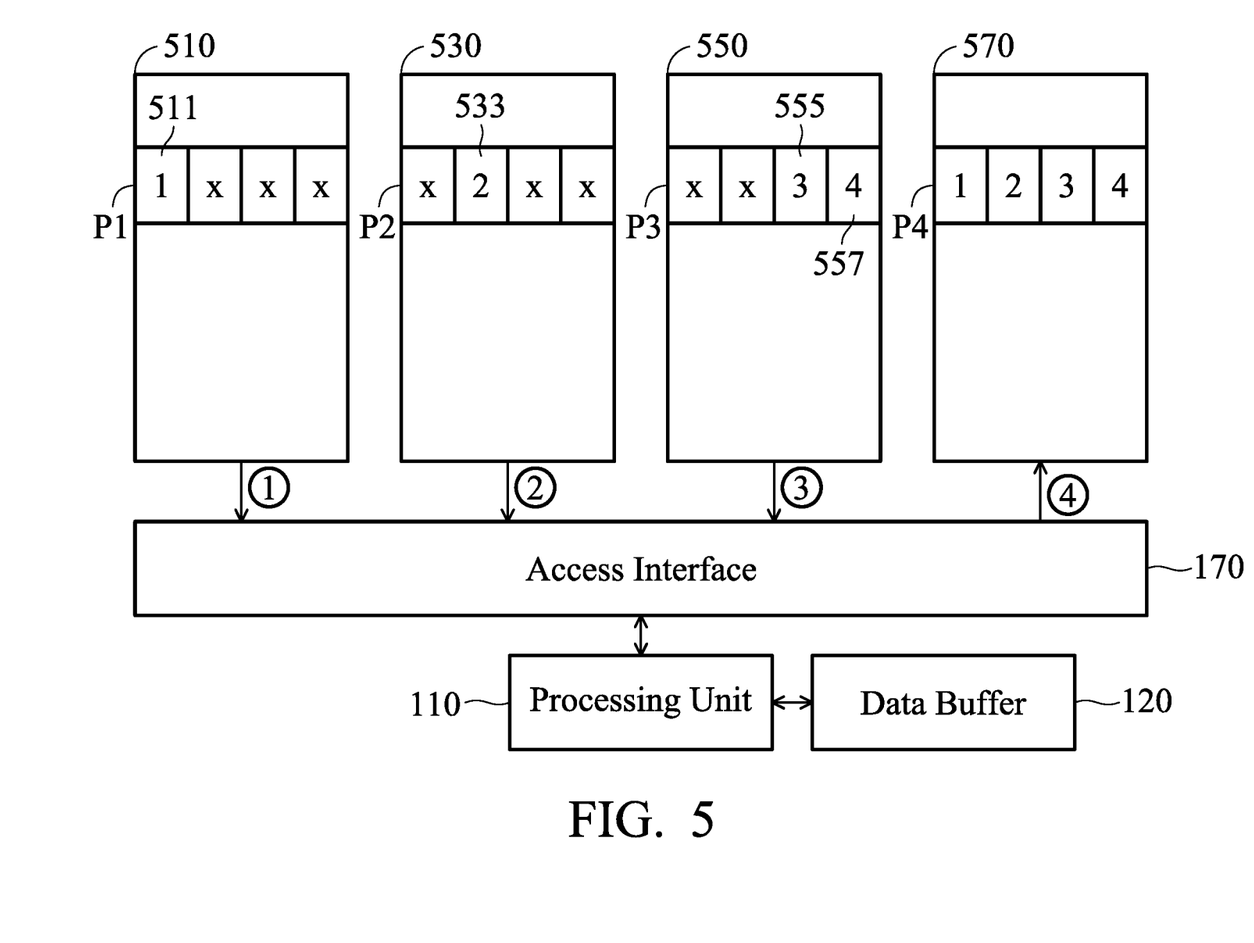
FIG. 5 is a schematic diagram of GC according to an embodiment of the invention.

FIG. 5 is a schematic diagram of GC according to an embodiment of the invention. Assume one page stores data of four sections: Through being accessed several times, the $0^{th}$ section 511 of the page P1 of the block 510 contains good data and the remaining sections contain stale data. The $1^{st}$ section 533 of the page P2 of the block 530 contains good data and the remaining sections contain stale data. The $2^{nd}$ and $3^{rd}$ sections 555 and 557 of the page P3 of the block 550 contain good data and the remaining sections contain stale data. In order to collect good data of the pages P1 to P3 in one page so as to store the good data in a new page P4 of the block 570, the GC process is performed. Specifically, space in the data buffer 120 is allocated to store one page of data. The processing unit 110 may read data of the page P1 from the block 510 via the access sub-interface 170, hold data of the $0^{th}$ section 511 of the page P1 and store it in the $0^{th}$ section of the allocated space of the data buffer 120 (step S455). Next, the processing unit 110 may read data of the page P2 from the block 530 via the access sub-interface 170, hold data of the $1^{st}$ section 533 of the page P2 and store it in the $1^{st}$ section of the allocated space of the data buffer 120 (step S455). Next, the processing unit 110 may read data of the page P3 from the block 550 via the access sub-interface 170, hold data of the $2^{nd}$ and $3^{rd}$ section 555 and 557 of the page P3 and store it in the $2^{nd}$ and $3^{rd}$ section of the allocated space of the data buffer 120 (step S455). Finally, the processing unit 110 may program data of the allocated space of the data buffer 120 into the page P4 of the block 570 (step S455).

In some embodiments, the timer issues an interrupt to the processing unit 110 when counting to the time period, enabling the processing unit to suspend the currently executed task, such as the instruction execution of the GC process, and execute an ISR (Interrupt Service Routine). The ISR, when being executed, sets one or more registers of the access interface 150 for clocking one page of data out to the host device 160 and resets the timer to recount the time. When the ISR is executed completely, the processing unit 110 resumes the suspended task, such as the instruction execution of the GC process.

In some embodiments, in step S455, the processing unit 110 may read the value of the timer after a read or write for one page of data, and determine whether the timer has counted to the time period. When the timer has counted to the time period, the processing unit 110 sets one or more registers of the access interface 150 for clocking one page of data out to the host device 160 and resets the timer to recount the time.

Figure 6:
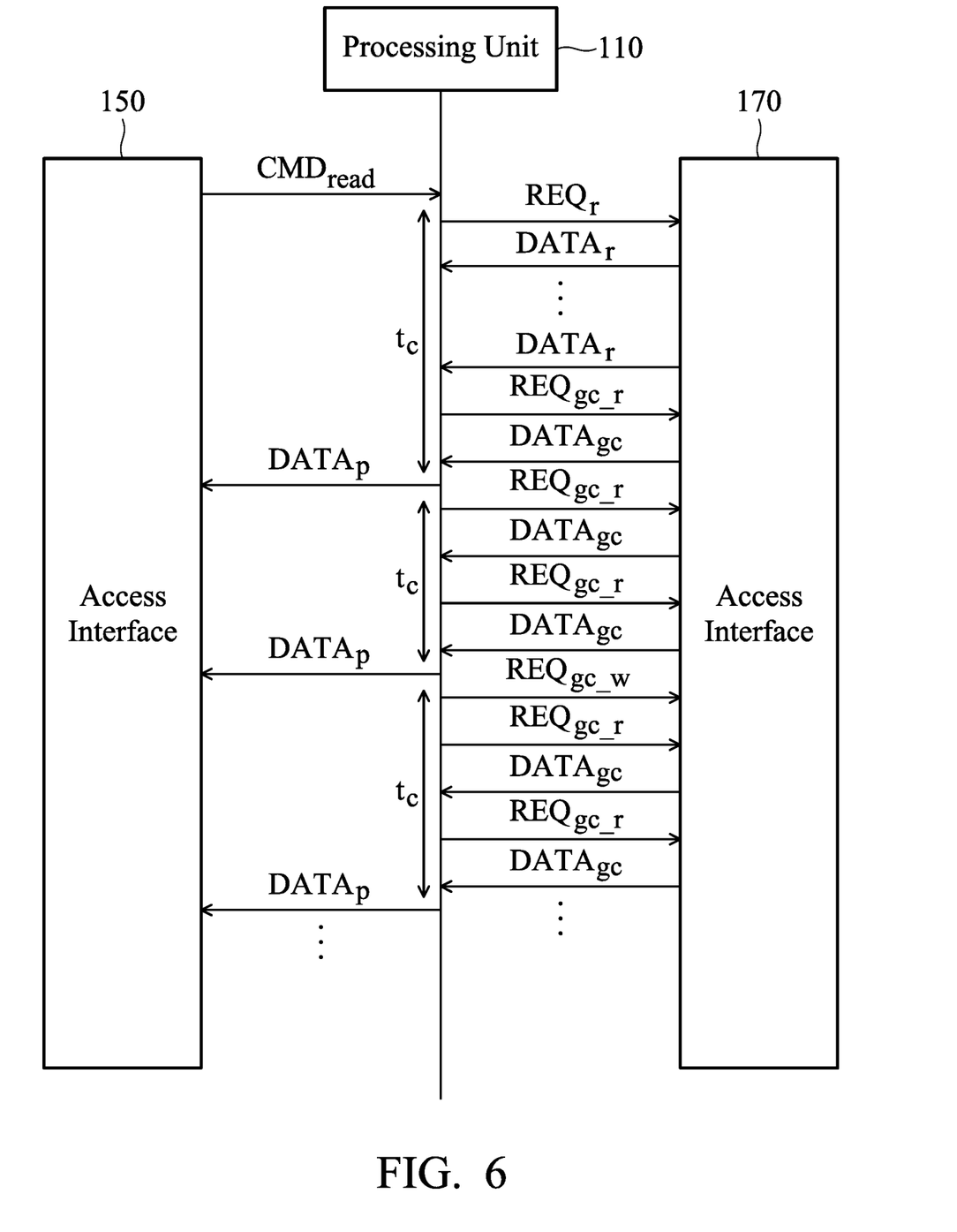
FIG. 6 is a message exchange diagram for integrating a host read process with a GC process according to an embodiment of the invention.

Scenarios are introduced to illustrate the aforementioned GC method. FIG. 6 is a message exchange diagram for integrating a host read process with a GC process according to an embodiment of the invention. The processing unit 110 receives a read command $CMD_{read}$ for requesting to read $DATA_r$ of 128K bytes from the host device 160 via the access interface 150 (step S410). Next, when a GC process needs to be performed (the "Yes" path of step S430), a timer is set to count to a time period $t_c$ (step S451), a data read request $REQ_r$ is sent to the storage unit 180 via the access interface 170, receives the data $DATA_r$ of 128K bytes from the storage unit 180 and the data $DATA_r$ is stored in the data buffer 120 (step S453). Next, instructions of the GC process are periodically executed, such as a data read request $REQ_{gc\_r}$ for reading one page of data or a data write request $REQ_{gc\_w}$ for programming one page of data (step S455). Each time the timer has counted to the time period $t_c$, the processing unit 110 sets one or more registers of the access interface 150 for clocking one page (16K Bytes) of data $DATA_r$ of the data buffer 120 out to the host device 160.

Although the embodiment has been described as having specific elements in FIGS. 1 to 3, it should be noted that additional elements may be included to achieve better performance without departing from the spirit of the invention. While the process flow described in FIG. 4 includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for garbage collection, performed by a processing unit, comprising:
   executing instructions of a GC (garbage collection) process to direct a first access interface to read data from a storage unit, collect good data from the read data and direct the first access interface to program the good data into a spare block of the storage unit;
   during the GC process, performing the following steps:
      starting a timer;
      periodically executing a data read request for reading one page of data from the storage unit or executing a data write request for writing one page of data to the storage unit;
      in response to a first expiration of the timer counting to a time period, directing a second access interface to clock a first portion of data that is requested by a current host read command from a host device, out to the host device, and resetting the timer; and
      in response to a second expiration of the timer counting to the timer period, directing the second access interface to clock a second portion of data that is requested by the current host read command from the host device, out to the host device, and resetting the timer;
   wherein the time period is shorter than a maximum tolerable time that the host device waits for a data reply.

2. The method of claim 1, wherein the timer issues an interrupt to the processing unit when counting to the time period, enabling the processing unit to suspend a currently executed task and execute an ISR (Interrupt Service Routine), and the processing unit directs the second access interface to clock a portion of data requested by the host device out to the host device and resets the timer when executing the ISR.

3. The method of claim 1, wherein the GC process and the directing the second access interface to clock the first and second portion of data out to the host device are executed in an interleaved fashion until the current host read command has completed.

4. The method of claim 1, comprising:
   determining whether a total number of spare blocks is fewer than a threshold after receiving a read command from the host device; and
   performing the GC process when the total number of spare blocks is fewer than the threshold.

5. The method of claim 4, comprising:
   directing the first access interface to read data requested by the read command from the storage unit; and
   storing the requested data in a data buffer.

6. The method of claim 5, wherein the first and second portion of data is obtained from the data buffer.

7. The method of claim 5, wherein the processing unit uses the second access interface to receive the read command from the host device through USB (Universal Serial Bus), ATA (Advanced Technology Attachment), SATA (Serial ATA) or PCI-E (Peripheral Component Interconnect Express) protocol.

8. An apparatus for garbage collection, comprising:
a first access interface, coupled to a storage unit;
a second access interface, coupled to a host device;
a processing unit, coupled to the first access interface and the second access interface, executing instructions of a GC (garbage collection) process to direct the first access interface to read data from the storage unit, collect good data from the read data and direct the first access interface to program the good data into a spare block of the storage unit,
wherein during the GC process, the processing unit is configured to:
start a timer;
periodically execute a data read request for reading one page of data from the storage unit or executing a data write request for writing one page of data to the storage unit;
in response to a first expiration of the timer counting to a time period, direct a second access interface to clock a first portion of data that is requested by a current host read command from a host device, out to the host device, and reset the timer; and
in response to a second expiration of the timer counting to the timer period, direct the second access interface to clock a second portion of data that is requested by the current host read command from the host device, out to the host device, and reset the timer;
wherein the time period is shorter than a maximum tolerable time that the host device waits for a data reply.

9. The apparatus of claim 8, wherein the timer issues an interrupt to the processing unit when counting to the time period, enabling the processing unit to suspend a currently executed task and execute an ISR (Interrupt Service Routine), and the processing unit directs the second access interface to clock a portion of data requested by the host device out to the host device and resets the timer when executing the ISR.

10. The apparatus of claim 8, wherein the GC process and the directing the second access interface to clock the first and second portion of data out to the host device are executed in an interleaved fashion until the current host read command has completed.

11. The apparatus of claim 8, wherein the processing unit determines whether a total number of spare blocks is fewer than a threshold after receiving a read command from the host device; and performs the GC process when the total number of spare blocks is fewer than the threshold.

12. The apparatus of claim 11, wherein the processing unit directs the first access interface to read data requested by the read command from the storage unit; and stores the requested data in a data buffer.

13. The apparatus of claim 12, wherein the first and second portion of data is obtained from the data buffer.

14. The apparatus of claim 12, wherein the processing unit uses the second access interface to receive the read command from the host device through USB (Universal Serial Bus), ATA (Advanced Technology Attachment), SATA (Serial ATA) or PCI-E (Peripheral Component Interconnect Express) protocol.

* * * * *